United States Patent
Satoh

(10) Patent No.: US 6,652,033 B2
(45) Date of Patent: Nov. 25, 2003

(54) FOOTREST UNIT FOR PASSENGER SEAT

(75) Inventor: Hiroaki Satoh, Omori-nishi (JP)

(73) Assignee: Minebea Co., Ltd., Miyota-machi (JP)

( * ) Notice: Subject to any disclaimer, the term of this patent is extended or adjusted under 35 U.S.C. 154(b) by 0 days.

(21) Appl. No.: 10/073,157

(22) Filed: Feb. 13, 2002

(65) Prior Publication Data

US 2002/0109389 A1 Aug. 15, 2002

(30) Foreign Application Priority Data

Feb. 15, 2001 (JP) ........................................ 2001-038639

(51) Int. Cl.[7] ................................................. A47C 7/50
(52) U.S. Cl. .............................. 297/423.3; 297/423.36; 297/423.32; 297/217.3
(58) Field of Search ........................ 297/423.36, 423.3, 297/423.27, 217.3, 423.32; 49/28, 26, 27

(56) References Cited

U.S. PATENT DOCUMENTS

| 2,563,629 | A | * | 8/1951 | Watter ................... 297/423.36 |
| 4,669,780 | A | * | 6/1987 | Sakakibara et al. ......... 297/257 |
| 4,944,116 | A | * | 7/1990 | Mewald ........................ 49/27 |
| 5,352,020 | A | * | 10/1994 | Wade et al. ........... 297/423.26 |
| 5,651,587 | A |   | 7/1997 | Kodaverdian |
| 5,755,493 | A |   | 5/1998 | Kodaverdian |
| 5,887,949 | A |   | 3/1999 | Kodaverdian |
| 5,918,942 | A | * | 7/1999 | Olsen ..................... 297/423.32 |
| 5,931,532 | A | * | 8/1999 | Kemmerer et al. ......... 297/330 |
| 6,223,467 | B1 | * | 5/2001 | Mahalek et al. ............... 49/27 |
| 6,373,005 | B1 | * | 4/2002 | Griesbach et al. ....... 200/61.44 |

* cited by examiner

Primary Examiner—Peter M. Cuomo
Assistant Examiner—Stephen D'Adamo
(74) Attorney, Agent, or Firm—Oliff & Berridge, PLC

(57) ABSTRACT

A leg rest and a seat back are rotatably mounted at the front and rear of a seat cushion of a passenger seat respectively, and a footrest is mounted on the leg rest in such a manner that it can be extended and retracted. Adjustment of the angle of the seat back and the leg rest, and positioning of the footrest are performed with a seat back actuator, a leg rest actuator, and a footrest actuator. A contact sensor is provided at the end of the footrest, wherein when the contact sensor detects contact with an obstacle, downward rotation of the leg rest is stopped and the footrest is moved backward. When the leg rest or the footrest is moved, the interference of the obstacle with the footrest such as a baggage can reliably be prevented.

7 Claims, 4 Drawing Sheets

FOOTREST UNIT FOR PASSENGER SEAT

BACKGROUND OF THE INVENTION

1. Field of the Invention

The present invention relates to a footrest unit for a passenger seat in such as aircraft, vessels.

2. Description of the Related Art

An embodiment of a passenger seat having a conventional footrest unit, which is installed in a cabin of an aircraft will be described with reference to FIGS. 7 and 8. In a seat 1, as shown in FIG. 7, a seat back 3 is rotatably mounted at a rear end of a seat cushion 2, a leg rest 4 is rotatably mounted at a front end of thereof, and a footrest 5 is mounted on the leg rest 4 in such a manner that it can be extended and retracted.

The seat back 3, the leg rest 4, and the footrest 5 are adjusted by actuators (not shown) such as electric motors, and a passenger who is seated at the seat 1 operates a switch (not shown) by hand; thus, the angle of the seat back 3 can freely be adjusted between an upright position (refer to the solid lines in FIG. 7) at which the seat back 3 is almost perpendicular to the seat cushion 2 and an almost horizontal position (refer to the chain double-dashed line A in FIG. 7), and the angle of the leg rest 4 can freely be adjusted between a housed position (refer to the chain double-dashed line B in FIG. 7) at which it is directed vertically downward and an almost horizontal position (refer to the chain double-dashed line C in FIG. 7). Also, the footrest 5 can freely be positioned between a retracted position (refer to the chain double dashed line B in FIG. 7), at which the footrest 5 is housed in the leg rest 4, and an extended position (refer to the chain double-dashed line C in FIG. 7) at which it is filly extended.

Accordingly, the seat back 3 and the leg rest 4 can be moved to the horizontal position and the footrest 5 can be extended to the extended position; thus, the seat 1 can be used as a bed (refer to the chain double-dashed lines A and C in FIG. 7).

However, in the seat 1 shown in FIG. 7, when the leg rest 4 is moved to the housed position from a state in which the footrest 5 is at the extended position, or when the footrest 5 is extended from a state in which the leg rest 4 is at the housed position, it is necessary that the end of the foot rest 5 does not interfere with the floor 6.

Accordingly, in the conventional art, when the footrest 5 is moved in relation with an angular position (or the operation time) of the leg rest 4 to move the leg rest 4 from the horizontal position to the housed position, the footrest 5 is automatically moved backward when the leg rest 4 is rotated downward to a specified angle, and when the footrest 5 is extended from the leg rest 4 when it is at the housed position, the footrest 5 is extended after the leg rest 4 is rotated upward to a specified position.

However, the conventional footrest unit of the seat 1 has the following problems: As shown in FIG. 8, for example, when an obstacle 7 such as a baggage of a passenger is placed on the floor 6 below the footrest 5 which is at the extended position, when the leg rest 4 is rotated to the housed position, the end of the footrest 5 comes into contact with the obstacle 7 before the leg rest 4 reaches the specified angular position at which the footrest 5 to be moved backward. There is, therefore, the risk that the obstacle or the seat 1 may be damaged as a result of the excess load applied thereto.

SUMMARY OF THE INVENTION

The present invention is made in the light of the above problems. Accordingly, it is an object of the present invention to provide a footrest unit for a passenger seat in which the interference of the movement of a footrest by an obstacle can be avoided during the operation of a leg rest or the footrest.

In order to achieve the above object, according to the present invention, a footrest unit of a passenger seat comprises: a leg rest which is rotatably mounted at a front end of a seat cushion; a footrest which is mounted on the leg rest in such a manner that it can be extended and retracted; actuators which can adjust the angle of the leg rest and the position of the footrest; and a contact sensor provided at the end of the footrest, wherein the footrest is moved backward when the contact sensor detects contact with an obstacle during the operation of the leg rest or the footrest.

In such an arrangement, when the contact sensor detects the presence of an obstacle during the operation of the leg rest or the footrest, the leg rest is moved backward to avoid interference with the obstacle.

In the footrest unit of a passenger seat according to the present invention, preferably, when the contact sensor detects contact with the obstacle, the downward rotation of the leg rest is stopped.

In such an arrangement, when the contact sensor detects contact with the obstacle, the downward rotation of the leg rest is stopped and the movement of the footrest toward the obstacle is stopped.

In the footrest unit of a passenger seat according to the present invention, preferably, the leg rest can be rotated between an almost horizontal position and a housed position directed almost vertically downward.

In such an arrangement, the leg rest and the footrest can be arbitrarily positioned between the horizontal position and the housed position.

In the footrest unit of a passenger seat according to the present invention, preferably, the contact sensor detects contact with the obstacle by the movement of movable parts.

In such an arrangement, the impact and reactive force which are generated when the footrest comes into contact with the obstacle are absorbed by the movement of the movable parts.

DESCRIPTION OF THE PREFERRED EMBODIMENTS

An embodiment of the present invention will be described hereinbelow with reference to the drawings.

Figure 1:
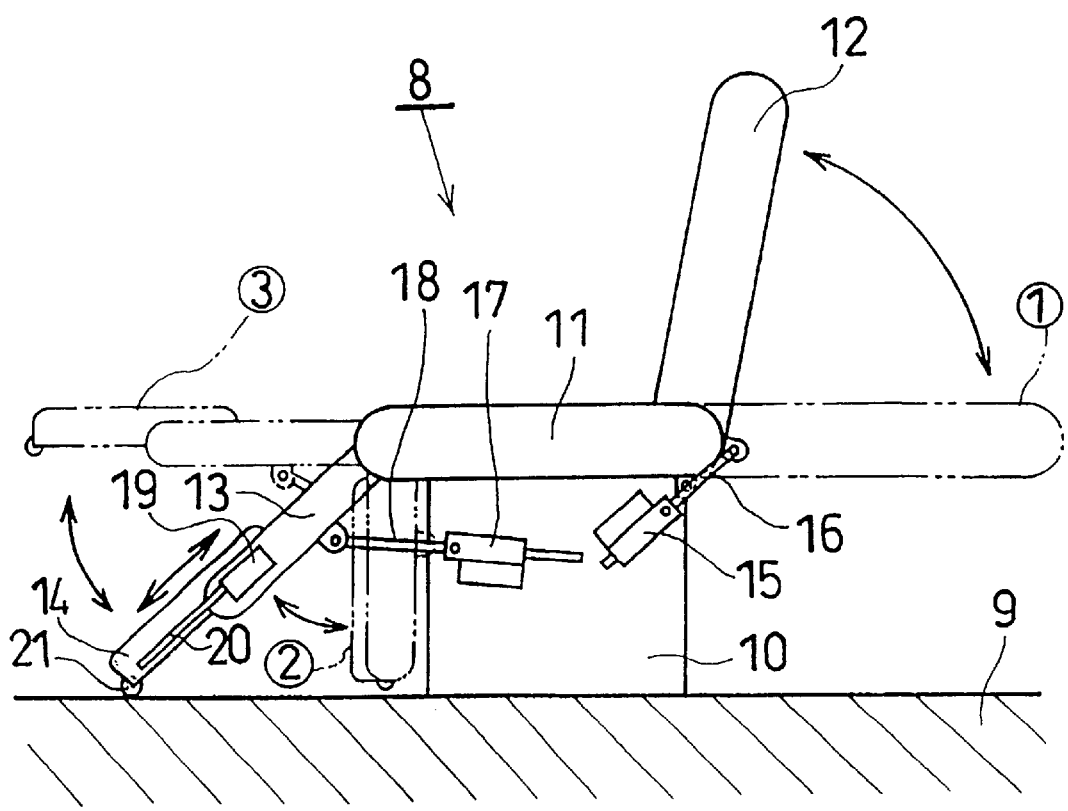
FIG. 1 is a side view showing a schematic structure of a passenger seat having a footrest unit according to an embodiment of the present invention.

As shown in FIG. 1, a passenger seat 8 according the embodiment is a reclining seat which is placed in a passenger cabin of an aircraft, wherein a base 10 fixed on a floor 9 of a body of the aircraft has a seat cushion 11, a seat back 12 provided at a rear end of the seat cushion 11, and a leg rest 13 arranged at a front end thereof, wherein the seat back 12 and the leg rest 13 are rotatably supported with respect to the seat cushion 11. In addition, the leg rest 13 has a footrest 14 mounted thereon in such a manner that it can be extended and retracted.

An operating rod 16 of a seat back actuator 15 which is mounted on the base 10 is connected to the seat back 12. By the expansion and contraction of the operating rod 16, the seat back 12 can be rotated between an uprising position (refer to the solid lines in FIG. 1) at which the seat back 12 is inclined slightly backward from an upright position and an almost horizontal position (refer to the chain double-dashed line A in FIG. 1).

An operating rod 18 of a leg rest actuator 17 (actuator) which is mounted on the base 10 is connected to the leg rest 13. By the expansion and contraction of the operating rod 18, the leg rest 13 can be rotated between a housed position (refer to the chain double-dashed line B in FIG. 1) at which it is directed vertically downward and an almost horizontal position (refer to the chain double-dashed line C in FIG. 1).

An operating rod 20 of a footrest actuator 19 (actuator) which is mounted on the leg rest 13 is connected to the footrest 14, wherein, by the expansion and contraction of the operating rod 20, the footrest 14 can be extended and retracted between a retracted position (refer to the chain double-dashed line B in FIG. 1), at which the foot rest 14 is housed in the leg rest 13, and an Tended position (refer to the chain double-dashed line C in FIG. 1), at which the foot rest 14 is fully extended.

The seat back actuator 15, the leg rest actuator 17, and the footrest actuator 19 are driven by a device such as an electric motor, and the operation and the suspension can be controlled by a switch (not shown) disposed at the hand of a passenger who is seated at the seat 8 via a controller (not shown), thereby fixing the seat back, the leg rest, and the footrest in arbitrary positions.

Figure 2:
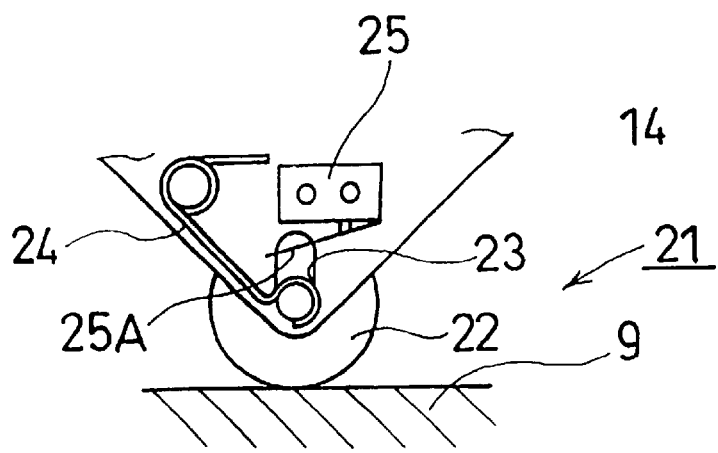
FIG. 2 is an enlarged view of a contact sensor of the unit in FIG. 1.

A contact sensor 21 is mounted at a lower rim of the footrest 14. The contact sensor 21 will be described with reference to FIG. 2. As shown in FIG. 2, a roller 22 (movable part) which extends along the lower rim of the footrest 14 is guided and supported by groove sections 23 formed at both sides of the footrest 14 in such a manner that the roller 22 can be extended and retracted. The roller 22 is elastically held by springs 24 at a position in which an outer periphery section of the roller 22 extends from the front end and a lower end of the footrest 14, and is pressed from the front or below of the footrest 14, so that the springs 24 are deflected to retract the roller 22 along the groove sections 23. At the inner end of the groove sections 23, a limit switch 25 is provided, wherein, when the roller 22 is moved backward along the groove sections 23, a lever 25A is pressed to turn on the limit witch 25.

The limit switch 25 is connected to the controller, and when the limit switch 25 is turned on, the controller causes the footrest actuator 19 to move the footrest 14 backward. In addition, the controller commands the leg rest actuator 17 to stop the downward rotation of the leg rest 13. The contact sensor 21 can also be arranged so that when the leg rest 13 is at a housed position and when the footrest 14 is at a retracted position (refer to the chain double-dashed line B in FIG. 1), the footrest 14 does not come into contact with the surface of the floor 9.

The operation of the present embodiment as constructed above will be described hereinbelow.

The passenger who is seated at the seat 8 operates the seat back actuator 15, the leg rest actuator 17, and the footrest actuator 19 with the switch near hand; accordingly, the passenger can freely adjust the angular position of the seat back 12 and the leg rest 13 and the extended position of the footrest 14. Furthermore, by moving the seat back 12 and the leg rest 13 to the horizontal position and extending the footrest 14 to the extended position, the passenger can use the seat 8 as a bed (refer to the chain double-dashed lines A and C).

Figure 3:
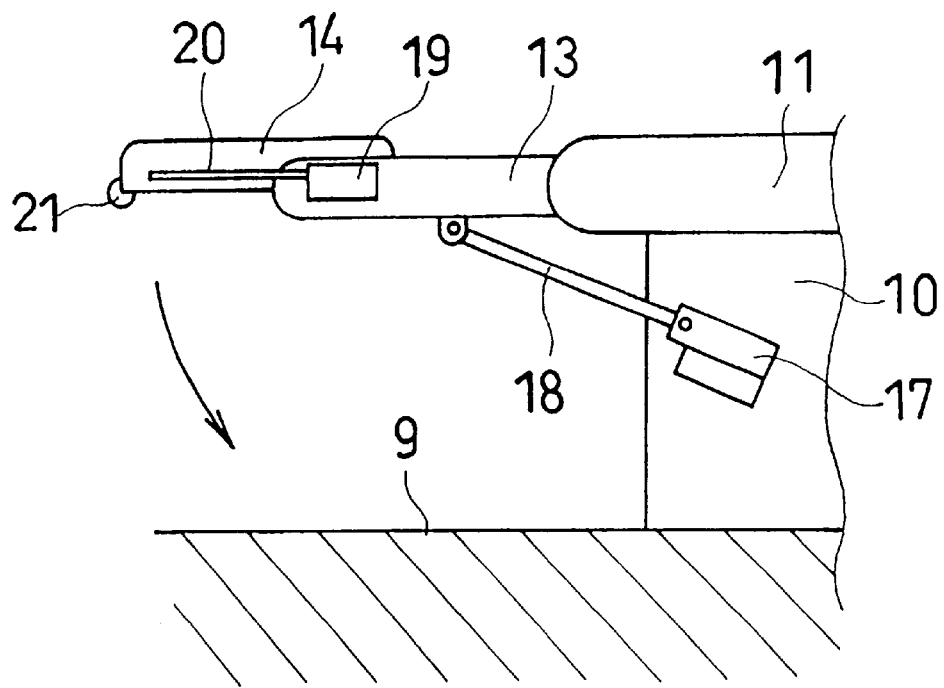
FIG. 3 is a view showing a state in which a footrest is at an extended position and a leg rest is at a horizontal position in the footrest unit shown in FIG. 1.
Figure 4:
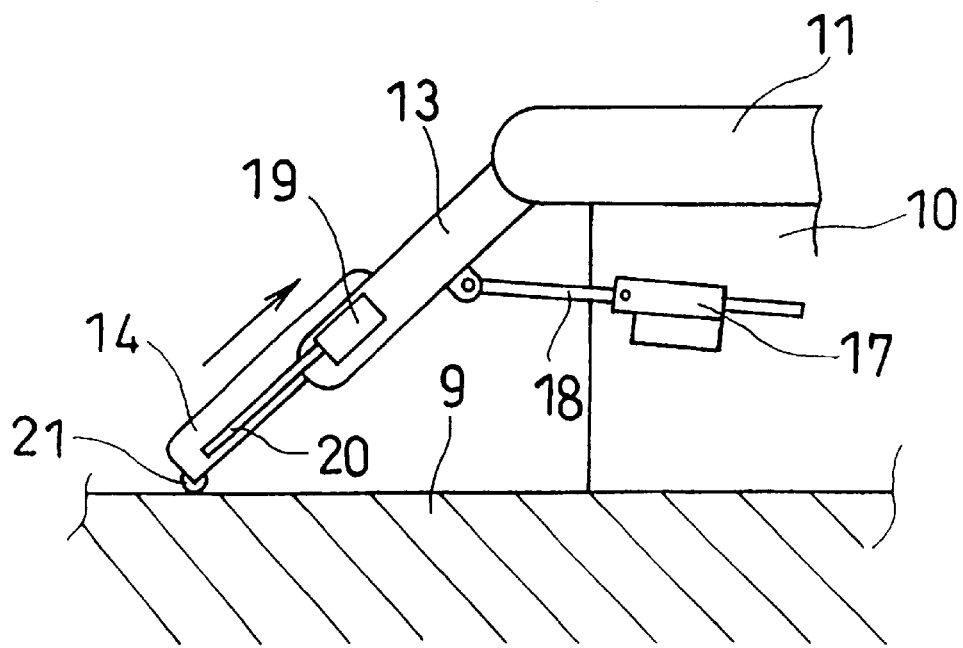
FIG. 4 is a view showing a state in which the contact sensor at the end of the footrest comes into contact with a floor by a downward rotation of the leg rest in the footrest unit shown in FIG. 1.
Figure 5:
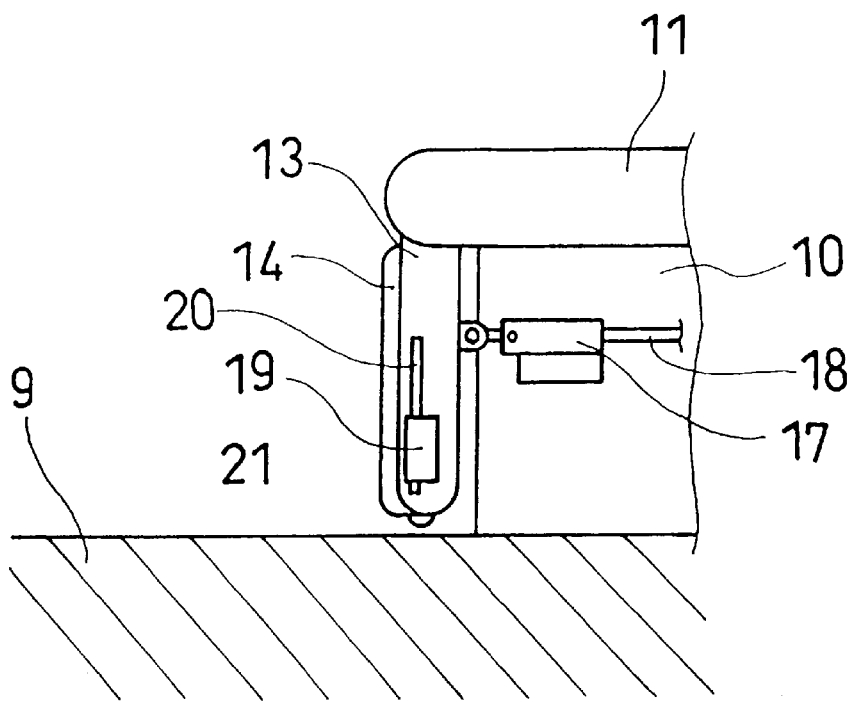
FIG. 5 is a view showing a state in which the footrest is at a retracted position and the leg rest is at a housed position in the footrest unit shown in FIG. 1.

In the case where the leg rest 13 which is at the horizontal position in a state in which the footrest 14 is extended, as shown in FIG. 3, is rotated downward to be moved to the housed position shown in FIG. 5, when the roller 22 of the contact sensor 21 provided at the lower rim of the end of the footrest 14 comes into contact with the floor 9 (obstacle), as shown in FIG. 4, the limit switch 25 is turned on. When the limit switch is turned on, the controller stops the leg rest actuator 17 in order to stop the downward rotation of the leg rest 13, and to operate the footrest actuator 19, thereby moving the footrest 14 backward. When the footrest 14 is moved backward and the roller 22 is moved away the floor 9, the limit switch 25 is turned off, and the operation of the leg rest actuator 17 is started to rotate the leg rest 13 further downward.

In this manner, the leg rest 13 and the footrest 14 can be moved to the housed position shown in FIG. 5 without the floor 9 interfering with the end of the footrest 14. In this instance, when the roller 22 comes into contact with the floor 9, the springs 24 are loosened, and the roller 22 is moved backward along the groove sections 23, and is rolled along the floor 9, so that there is a significant reduction in the impact and the reactive force generated at the time of contact. Thus, the leg rest 13 and the footrest 14 can be moved smoothly. In addition, when the rate of the backward movement of the footrest 14 is sufficiently higher than the rate of rotation of the leg rest 13, the interference of the floor 9 with the footrest 14 can be avoided without temporarily stopping the downward rotation of the leg rest 13.

Figure 6:
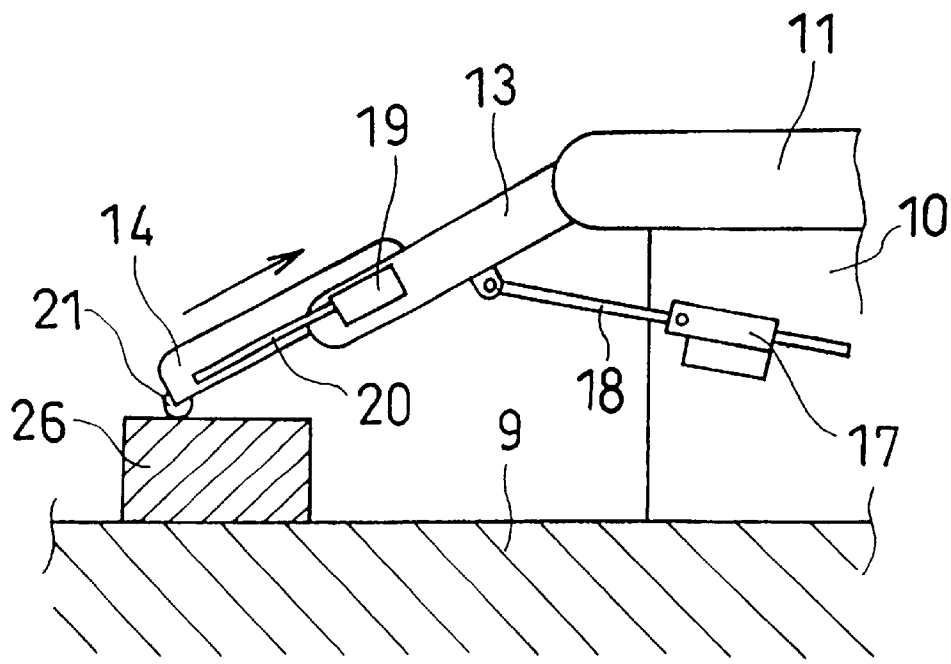
FIG. 6 is a view showing a state in which the contact sensor at the end of the footrest comes into contact with an obstacle by the downward rotation of the leg rest in the footrest unit shown in FIG. 1.
Figure 7:
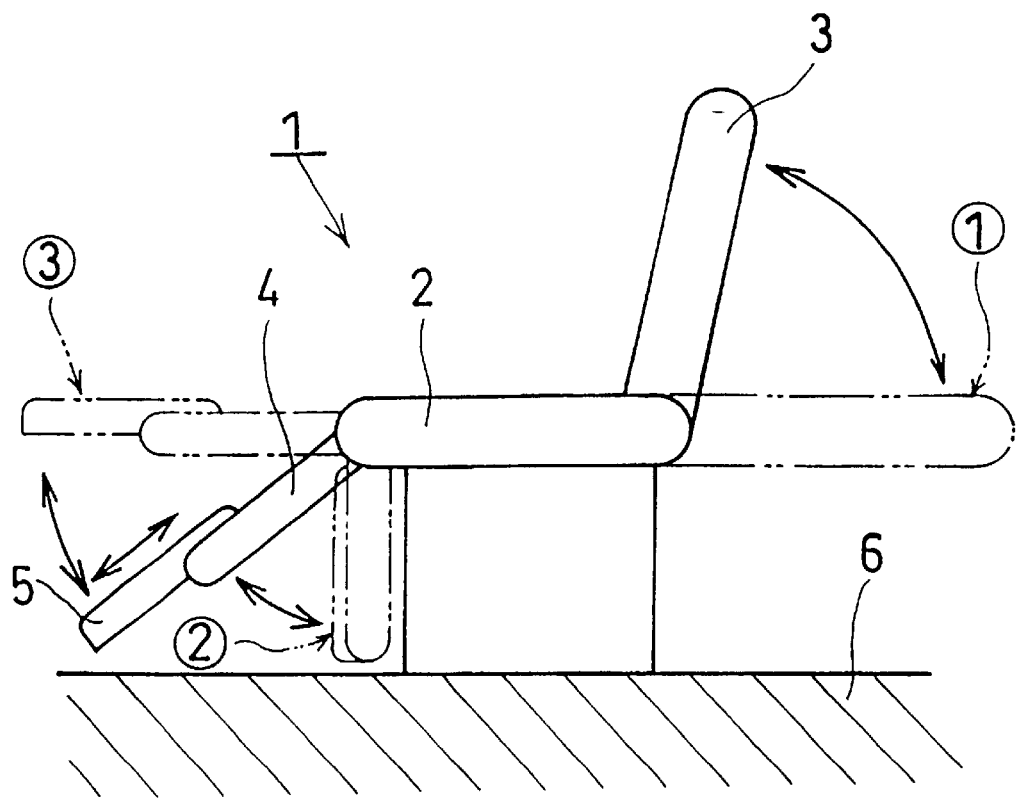
FIG. 7 is a side view showing a schematic structure of an aircraft seat having a conventional footrest unit.
Figure 8:
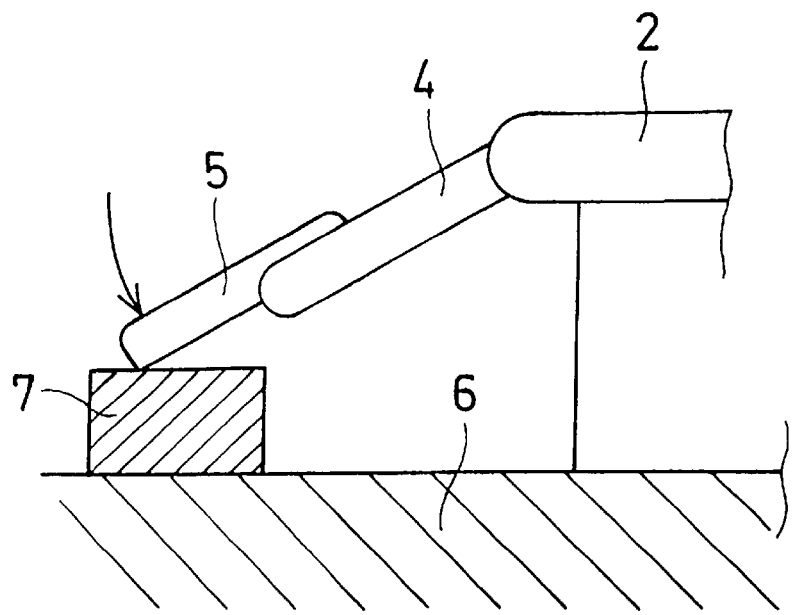
FIG. 8 is a view showing a state in which the end of the footrest comes into contact with the obstacle 1: the downward rotation of the leg rest in the conventional footrest unit shown in FIG. 7.

In the case where an obstacle 26 such as baggage is placed on the floor 9 below the footrest 14, as shown in FIG. 6, when the roller 22 of the contact sensor 21 of the footrest 14 comes into contact with the obstacle 26 dug the downward rotation of the leg rest 13, the limit switch 25 is turned on, and the downward rotation of the leg rest 13 is temporarily stopped and the footrest 14 is moved backward, similar to the above. Thus, the interference of the obstacle 22 with the footrest 14 can be avoided and the leg rest 13 and the footrest 14 can be moved smoothly to the housed position shown in FIG. 5. In this manner, damage to the baggage or the like resulting from the interference of the baggage with the footrest 14 or damage to the seat 8 resulting from the excess load applied thereto can reliably be prevented.

In the above-described embodiment, for example, although the roller and the limit switch are used as a contact sensor, another contact sensor including the other movable parts and a touch switch can also be used. In the above-described embodiment, although a seat in which the seat cushion is fixed is described as an example, the present invention is not limited to the above, and can be similarly applied to a seat in which the seat back can be slid in accordance with the rotation of the seat back. Also, in the above-described embodiment, while a case in which the present invention is applied to passenger seats of the aircrafts, the present invention is not limited to the above, and can similarly be applied to passenger seats in such as vehicles and vessels.

As specifically described, in the footrest unit for the passenger seat according to the present invention, since when contact with the obstacle is detected by the contact sensor and the footrest is moved backward, when the leg rest or the footrest is moved, the interference of the obstacle such as a baggage with the footrest can reliably be avoided. Consequently, damage to the baggage resulting from the interference with the footrest and damage to the seat due to the excessive load applied thereto can reliably be prevented.

In the footrest unit of the passenger seat according to the present invention, when the contact sensor detects an obstacle, the downward rotation of the leg rest is stopped and the movement of the footrest towards the obstacle is stopped. Accordingly, the interference of the obstacle with the footrest can reliably be prevented.

In the footrest unit of the passenger seat according to the present invention, the leg rest and the footrest can be arbitrarily positioned between the horizontal position and the housed position.

In the footrest unit of the passenger seat according to the present invention, the contact sensor detects contact with the obstacle by the movement of the movable parts, thereby absorbing the impact and the reactive force at the time of contact by the movement of the movable parts and thereby smoothly avoids interference with the obstacle.

What is claimed is:

1. A footrest unit for a passenger seat, comprising:

a leg rest which is rotatably mounted at a front end of a seat cushion;

a footrest which is mounted on the leg rest in such a manner that it can be extended and retracted;

a plurality of actuators which can adjust the angle of the leg rest and the position of the footrest; and a contact sensor including a roller and a limit switch, which is provided at the end of the footrest, wherein the footrest is moved backward wren the contact sensor detects contact with an obstacle during the operation of the leg rest or the footrest.

2. The footrest unit for a passenger seat according to claim 1, wherein the contact sensor detects contact with the obstacle by the movement of movable parts.

3. The footrest unit for a passenger seat according to claim 1, wherein, when the contact sensor detects contact with the obstacle, downward rotation of the leg rest is stopped.

4. The footrest unit for a passenger seat according to claim 3, wherein the leg rest can be rotated between an almost horizontal position and a housed position directed almost vertically downward.

5. The footrest unit for a passenger seat according to claim 3, wherein the contact sensor detects contact with the obstacle by the movement of movable parts.

6. The footrest unit for a passenger seat according to claim 1, wherein the leg rest can be rotated between an almost horizontal position and a housed position directed almost vertically downward.

7. The footrest unit for a passenger seat according to claim 6, wherein the contact sensor detects contact with the obstacle by the movement of movable parts.

* * * * *